United States Patent [19]

Tronto et al.

[11] Patent Number: 5,207,812
[45] Date of Patent: May 4, 1993

[54] FILTER CARTRIDGE

[75] Inventors: Gregory S. Tronto, Wilmington; Raymond Wnenchak, Newark, both of Del.

[73] Assignee: W. L. Gore & Associates, Inc., Newark, Del.

[21] Appl. No.: 880,810

[22] Filed: May 8, 1992

[51] Int. Cl.$^5$ .............................................. B01D 46/24
[52] U.S. Cl. ........................................ 55/498; 55/521; 55/524; 55/528
[58] Field of Search .................. 55/489, 498, 521, 524, 55/527, 528

[56] References Cited

U.S. PATENT DOCUMENTS

| 3,716,436 | 2/1973 | Pall et al. | 55/521 X |
| 4,436,536 | 3/1984 | Robinson | 55/345.1 |
| 4,732,678 | 3/1988 | Humbert | 55/498 X |
| 4,878,930 | 11/1989 | Manniso et al. | 55/498 X |

Primary Examiner—Charles Hart
Attorney, Agent, or Firm—Gary A. Samuels

[57] ABSTRACT

A pleated filter cartridge for removing particles or dust from a gas stream is described. The cartridge is made of a perforated support tube, a pleated filter medium around said tube, and end caps into which the ends of the filter medium, and the tube are sealed, wherein the pleated filter medium has less than seven pleats per inch.

4 Claims, 2 Drawing Sheets

FILTER CARTRIDGE

FIELD OF THE INVENTION

This invention relates to cartridge filters for use in filter systems designed to remove solid particles or dust from large volumes of gases, including air, in which they are suspended, such as industrial sweepers, bag houses, plenum type dust collectors, and the like.

BACKGROUND OF THE INVENTION

Filtration systems which employ cartridge filters employ a porous filter material through which the gaseous medium passes, the solids being retained on the upstream surface of the filter medium as the gases pass through. The separated solids build up on the upstream side of the filter medium with time and must be removed before the thickness of the accumulated solids layer causes excessive pressure drop. In current practice, the filter cake is dislodged from the filter elements by means of a pulse of compressed air admitted to the filter element, a reverse air flow, or a shaker mechanism. The filter medium flexes under the force of the air pulse to dislodge the filter cake and the flow of gases being filtered is maintained while such flexing and dislodging is taking place.

Cartridge filters generally have a folded or pleated filter medium arranged cylindrically around a perforated cylindrical supporting member or tube. The supporting tubes and filter medium are adhered to end caps which prevent leakage around the filter medium and provide support for the filter medium.

For the most part, felts and fabrics have been used as the filter media with the addition of paper and other nonwoven backings. Cartridges of these types typically pack pleats very close together, e.g. 7-12 pleats per inch, for two reasons: (1) to maximize filter media surface area, and (2) to improve physical strength of the thin filter media where each pleat is unsupported to the cartridge during operation and cleaning.

An example is found in U.S. Pat. No. 4,878,930 *Manniso, et al.* which uses an expanded porous polytetrafluoroethylene (ePTFE) membrane laminated to a felt or fabric and which is supported by a wire backing. The pleat spacing is greater than typically used with other filter media due to the fact that ePTFE membranes are more easily cleaned. On the cleaning cycle, it is important to leave enough space to allow dust (dirt, product, etc.) to exit the pleat space. This is the reason why ePTFE membrane filter cartridges are ruggedly supported, to allow the spacing for efficient cleaning while supporting the relatively open pleat that could not be supported by conventional means. It was, therefore, felt that a lightweight media would have to have tightly packed pleats to obtain support during cleaning and thereby avoid blow-out failure. The tight pleat needed to support such a cartridge is very inefficient in the cleaning cycle; thus, this leads to product build-up and high pressure drops. A more open pleat does not work well because high pressure pulsed air needed to clean that filter would blow out the cartridge.

It was previously believed that the use of ePTFE laminated to a nonwoven would have to be manufactured in the conventional way to give support to the media in the form of stays or the like. It was further reasoned that a tight pleat was needed for support would minimize the effectiveness of the cleanable ePTFE laminate.

SUMMARY OF THE INVENTION

The invention involves the surprising finding that ePTFE membrane laminated to a nonwoven or felt fabric backing can be used in a high grain loading, high pressure environment found in industrial baghouses with open pleat spacings of less than seven pleats per inch, and wthout any external support.

Thus, the invention can be described as:

A pleated filter cartridge comprising:
a) a porous support tube,
b) a pleated filter media around said tube, comprising a composite laminate of porous expanded polytetrafluoroethylene and a nonwoven or felt textile backing,
c) end caps into which the ends of the filter media and the tube are sealed, wherein the pleated filter media has less than seven pleats per inch (2.54 cm).

By porous is meant that gases can pass through.

DESCRIPTION OF THE INVENTION

Figure 1:
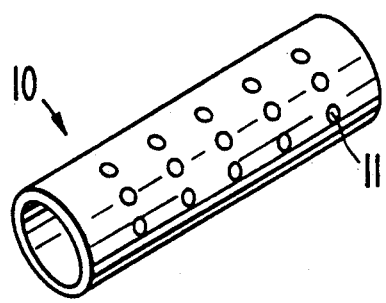
FIG. 1 is a perspective view of a perforated support tube 10 having perforations 11.
Figure 2:
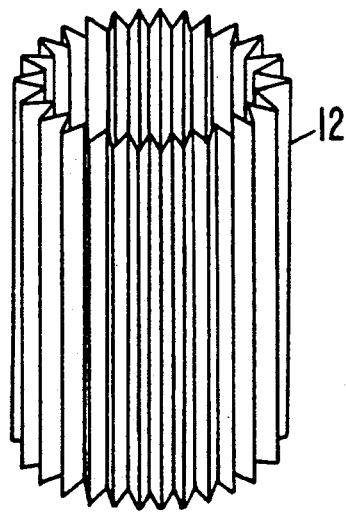
FIG. 2 is a perspective view of pleated cylindrical filter media 12.
Figure 3:
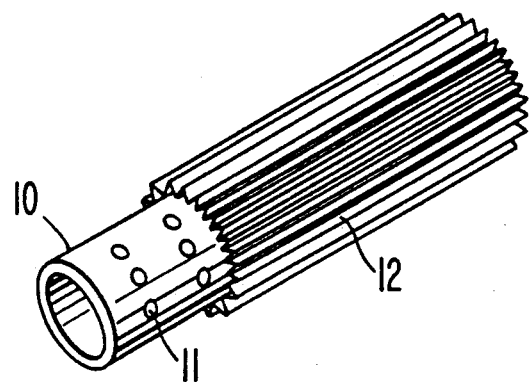
FIG. 3 is a view of support tube 10 having the filter media 12 around a portion of it.
Figure 4:
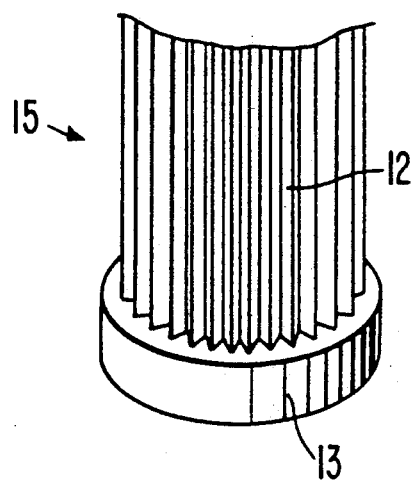
FIG. 4 depicts a cut-a-way view of cartridge 15 having filter media 12 embedded in end cap member 13.

The porous support tube can made of a porous plastic, e.g., one having interconnecting pores from one side to the other. The tube should be rigid in order to provide support to the filter media. The tube can be made of porous polyethylene, polypropylene, polyvinylstyrene, polyamide, polyester or the like. Preferably, the tube will be a perforated metal tube such as steel, iron or most preferably expanded aluminum.

A sheet of filter medium of the same length as the support tube is folded or pleated and formed into a pleated cylindrical filter. The filter material for use in this invention is a composite sheet of porous expanded polytetrafluoroethylene film bonded to a nonwoven or felt textile backing material. The porous expanded polytetrafluoroethylene film is prepared in accordance with one or more of U.S. Pat. Nos. 4,187,390; 4,110,392; 4,096,227; 3,962,153; 3,953,566; and 4,025,679. The nonsticking properties of the polytetrafluoroethylene surfaces of such composites minimize the sticking and consequent build-up of particles being filtered from the gas stream to the filter and also facilitate periodic removal of any filter cake build-up by pulse jet or other cleaning method.

It has been found that less than seven pleats per inch is effective in this invention. It has also been found that the filter media can withstand over 2 grains per cubic foot (4.5 mg per liter) of particle filled gases, and preferably over 5 grains (11.4 mg per liter).

To make the cartridges of this invention a porous support tube of appropriate length and diameter obtained. Then the filter media is selected and pleated with less than seven pleats per inch, but usually at least two, and is constructed of a diameter that fits closely around the tube.

After sliding the pleated filter media tube over the support tube, the ends of the filter media and the support tube are then sealed to end caps, such as, by using adhesives or imbedding in rubbers, thermoplastic resins, plastisols, or the like. In one embodiment, a contoured end cap with the contour following or approximating in shape that of the pleats in the filter medium can be used. The end caps can be a metal or plastic cap or the molded thermoplastic resin and its imbedded components can serve as the end cap. This can be made by imbedding or potting the ends of the filter assembly in the requisite potting material, letting it harden sufficiently to hold its shape, removing the mold, and allowing the potting material to continue to cure to a hard completely cured end cap.

Surprisingly, the pressure needed to clean the structure of this invention is so low that there is no need to attach the filter media to any support other than the support tube or the potting at the ends. However, inner or outer ring supports may be added for extra support in very high pressure applications.

EXAMPLES

The following examples illustrate the effectiveness of this type of filter cartridge.

EXAMPLE 1

Two filer cartridges were constructed, starting with an expanded porous polytetrafluoroethylene (ePTFE) membrane laminated to a 6 ounce polyester nonwoven backing material. The membrane laminate was slit to a width of 26 inches (66.04 cm) and folded into 1.0 inch (2.54 cm) pleats on a pleating machine. The first filter was made with 50 pleats (2.9 pleats per inch) (18 ft$^2$ (1.67 m$^2$) filter media) and the second filter was made with 60 pleats (3.5 pleats per inch) (22 ft$^2$ or 2.04 m$^2$ filter media). The pleated filter media was formed into a cylindrical shape and the two end pleats were glued together with a polyamide hot melt. The ePTFE membrane was scraped off the area to be glued prior to applying the hot melt to improve adhesion.

The filter support tubes were constructed by cutting sheets of 26 gauge (0.046 cm) expanded aluminum which were 26 inch (66.04 cm) long by 12 inch (30.48 cm) wide. These were formed into cylindrical tubes with an inside diameter of 3.5 inch (8.89 cm). The edges of the metal sheets were overlapped in the tube approximately 1.0 inch (2.54 cm). The tubes were held in place using strands of 18 gauge (0.121 cm) wire until they were spot welded.

The filter cartridges were assembled by sliding the expanded aluminum into the center of the pleated filter media, which had been glued to form a cylindrical tube. This construction was then potted into a galvanized steel end cap with an outside diameter of 5.5 inch (13.97 cm) and an inside diameter of 3.5 inch (8.89 cm) and 0.375 inch (0.9525 cm) deep. The end cap contained a potting material consisting of a heat-curable polyvinylchloride. The curing of the potting compound was completed in 20 minutes on a hot plate at 385° F. (196° C.). The bottom of the filter was then potted in the same manner with another galvanized end cap with an outside diameter of 5.5 inch (13.97 cm) and no center hole; this cap was also 0.375 inch (0.9525 cm) deep.

EXAMPLE 2

Seventeen cartridge filters were retrofitted into a dust collector filter system. This dust collector, which was build by Allied Industries (Houston, Tex.), was designed to utilize 17 filter bag cartridges.

The cartridges installed in the collector were 24 inch (60.96 cm) long with an outside diameter of 5.5 inch (13.97 cm) and an inside diameter of 3.5 inch (8.89 cm). They were constructed in the same manner as described in Example 1; however, the filter cores were constructed with expanded mild steel instead of expanded aluminum. Each filter contained 50 pleats, so the total filter area in the collector was 283 ft$^2$ (26.29 m$^2$).

A test was conducted for 14 hours during which the collector was run with an airflow of 400 cubic feet per minute (679 cubic meter per hour) and a dust loading greater than 10 grains per cubic feet (22.4 mg per liter) of air. Each filter was pulsed every 65 seconds at a pulse pressure of 35 pounds per square inch (2.46 Kg/cm$^2$). The presure drop measured across the filter media was 0.5 inch (1.27 cm) of water and remained at this level for the duration of the test.

The collector was opened after the test to examine the conduction of the filters. The surface of the filter media was extremely clean. No measurable dust cake was present on the membrane surface and no dust was present between the pleats. None of the pleats were damaged by the air pulse, despite the fact that no external supports were holding the pleats to the metal core.

We claim:
1. A pleated filter cartridge consisting essentially of:
   a. a perforated support tube,
   b. a pleated filter medium around said tube, comprising a laminate of a nonwoven or felt backing and an expanded porous polytetrafluoroethylene,
   c. end caps into which the ends of the filter medium, and the tube is sealed,
   wherein the pleated filter medium has less than seven pleats per inch and is not supported by any external support other than the structure recited in elements a), b) and c).
2. The cartridge of claim 1 wherein the cartridge can withstand a grain loading of at least 2 grains per cubic foot (4.5 mg per liter).
3. The filter cartridge of claim 1 wherein the laminate is a laminate of a nonwoven backing.
4. The filter cartridge of claim 3 wherein the nonwoven backing is polyester.

* * * * *

REEXAMINATION CERTIFICATE (3014th)
United States Patent
Tronto et al.

[11] B1 5,207,812
[45] Certificate Issued Oct. 1, 1996

[54] FILTER CARTRIDGE

[75] Inventors: Gregory S. Tronto, Wilmington; Raymond Wnenchak, Newark, both of Del.

[73] Assignee: Gore Holdings, Inc., Newark, Del.

Reexamination Request:
No. 90/004,052, Nov. 15, 1995

Reexamination Certificate for:
Patent No.: 5,207,812
Issued: May 4, 1993
Appl. No.: 880,810
Filed: May 8, 1992

[51] Int. Cl.$^6$ .................................................. B01D 46/24
[52] U.S. Cl. ............................ 55/498; 55/521; 55/524; 55/528
[58] Field of Search .................... 55/486, 487, 489, 55/498, 502, 521, 524, 527, 528, 302; 210/323.2, 493.1, 493.2, 493.5, 497.01, 497.2, 499, 506, 507; 95/279, 280

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 264/41 X |
| 4,025,679 | 5/1977 | Denny | 428/91 |
| 4,096,227 | 6/1978 | Gore | 264/210 R |
| 4,110,392 | 8/1978 | Yamazaki | 264/127 |
| 4,187,390 | 2/1980 | Gore | 55/486 X |
| 4,259,095 | 3/1981 | Johnson, Jr. | 55/302 |
| 4,424,070 | 1/1984 | Robinson | 55/302 X |
| 4,609,465 | 9/1986 | Miller | 210/323.2 |
| 4,775,398 | 10/1988 | Howeth | 55/302 |
| 4,836,834 | 6/1989 | Steele | 95/279 |
| 5,332,448 | 7/1994 | Phillips | 95/279 X |
| 5,409,512 | 4/1995 | Wilkerson et al. | 55/302 |

FOREIGN PATENT DOCUMENTS

| | | |
|---|---|---|
| 0139822 | 5/1985 | European Pat. Off. . |
| 0217482 | 4/1987 | European Pat. Off. . |
| 59-105813 | 6/1984 | Japan . |
| 62-27019 | 1/1987 | Japan . |
| 1-034403 | 2/1989 | Japan . |
| 2222964 | 3/1990 | United Kingdom ........... 55/302 |

*Primary Examiner*—Robert H. Spitzer

[57] ABSTRACT

A pleated filter cartridge for removing particles or dust from a gas stream is described. The cartridge is made of a perforated support tube, a pleated filter medium around said tube, and end caps into which the end of the filter medium, and the tube are sealed, wherein the pleated filter medium has less than seven pleats per inch.

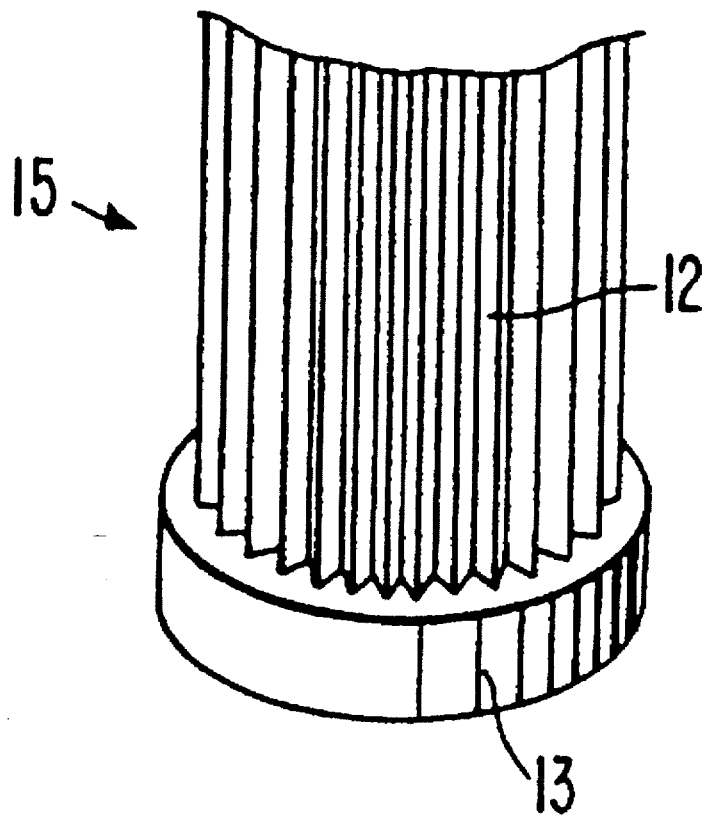

B1 5,207,812

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are determined to be patentable as amended.

1. [A] *In a gas filtration system that separates solids from a gas stream, said gas filtration system having a gas stream inlet, a housing, a pulse air system, a gas stream outlet and a* pleated filter cartridge, *said pleated filter cartridge being mounted in said housing, the improvement comprising said pleated filter cartridge* consisting essentially of:

a. a perforated support tube[.]*;* b. a pleated filter medium around said tube, comprising a laminate of a nonwoven or felt backing and an expanded porous polytetrafluoroethylene[.]*;* c. end caps into which the ends of the filter medium[,] and the tube [is] *are* sealed[.]*;* wherein the pleated filter medium has less than seven pleats per inch and is not supported by any external support other than the structure recited in elements a), b), and c)[.]*;*

*wherein the pleated filter cartridge, when used in said gas filtration system, is responsive to pulse air cleaning from said pulse air system without incurring damage to said pleats.*

2. The [cartridge] *gas filtration system* of claim 1 wherein the cartridge can withstand a grain loading of at least 2 grains per cubic foot (4.5 mg per liter).

3. The [filter cartridge] *gas filtration system* of claim 1 wherein the laminate is a laminate of a nonwoven backing.

4. The [filter cartridge] *gas filtration system* of claim 3 wherein the nonwoven backing is polyester.

* * * * *